(No Model.)
W. J. SCULTHORP.
TOBACCO HANGER.
No. 447,242. Patented Feb. 24, 1891.
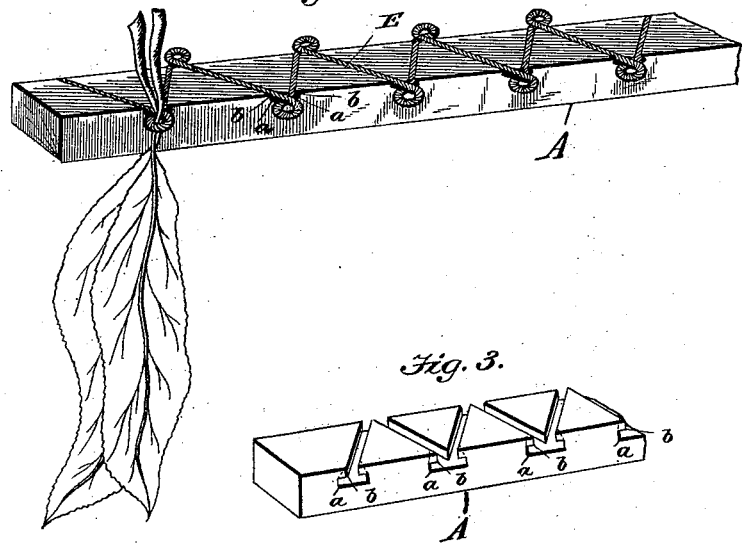
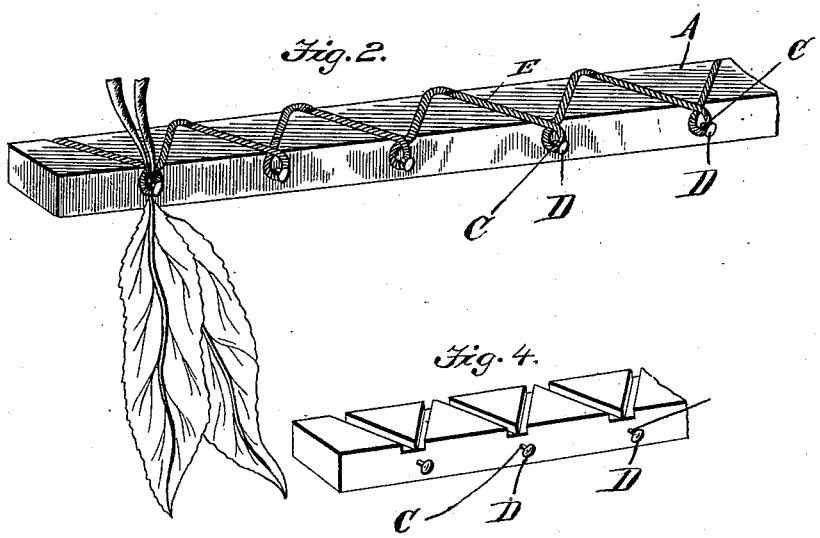
Witnesses:
Inventor:
Walter Jones Sculthorp
By,
Attorney

UNITED STATES PATENT OFFICE.

WALTER JONES SCULTHORP, OF COLUMBIA GROVE, ASSIGNOR OF ONE-HALF TO CHARLES MADISON HARDY, OF REEDY, VIRGINIA.

TOBACCO-HANGER.

SPECIFICATION forming part of Letters Patent No. 447,242, dated February 24, 1891.

Application filed February 6, 1890. Serial No. 339,413. (No model.)

*To all whom it may concern:*

Be it known that I, WALTER JONES SCULTHORP, a citizen of the United States, residing at Columbia Grove, county of Lunenburg, and State of Virginia, have invented certain new and useful Improvements in Tobacco-Hangers, of which the following is so full, clear, and exact a description as will enable others skilled in the art to which my invention appertains to make and use the same.

In the accompanying drawings, Figure 1 is a perspective view of my improved hanger, showing grooves and under-cuts. Fig. 2 is a similar view, showing also the pins with enlarged heads. Figs. 3 and 4 are detail views of Figs. 1 and 2, respectively, the cords removed to show hanger.

My invention relates to "tobacco-hangers," and has for its object the provision of a tobacco-hanger by the use of which accidental displacement of the leaves and cable will be entirely avoided. To that end it consists in providing a stick with stops, against the under side of which the cable will come into contact, when the cable, by reason of the strain upon it, or by reason of the action of the wind, or any other force acting on the leaves from underneath to raise them vertically out of place after they are secured to the hanger by the cable, has a tendency to rise above the plane of its proper level.

In the accompanying drawings, A designates a stick which is provided with stops $b\,b$, which may be formed either by putting pins along the side of the stick or by cutting grooves across the stick and providing the groove with an under-cut $a$, the upper boundary of which is below the plane of the surface of the stick, and the bottom of which extends beyond the plane of the side of the groove.

In practice I prefer to make the grooves extend diagonally across the top of the stick, and to intersect each other at the edge of the stick, bringing the junctions of the grooves to diagonally-opposite points in a staggered series on the stick.

Instead of forming the stops as above described, they may be a series of pins C, extending along the sides of the stick and having enlarged heads D.

From the foregoing and by reference to the drawings it will be understood that a hanger constructed and described as shown may be used without liability of accidental displacement of cable E and leaves from any cause whatever, unless, in fact, of the stems of the leaves being entirely broken off or the cable itself be severed or loosened by some unusual force or strain.

What I desire to secure by Letters Patent, and what I therefore claim, is—

1. A tobacco-hanger consisting of a stick provided with stops at its sides below the top of the stick to prevent accidental displacement of the cable, in combination with the cable, substantially as and for the purposes specified.

2. A tobacco-hanger consisting of a stick provided with grooves in its surface which extend across the stick to opposite sides, and which grooves end and communicate with recesses or under-cuts at the sides of the stick, substantially as described.

3. A tobacco-hanger consisting of a stick provided with grooves on its surface, which grooves intersect each other at opposite sides of the stick, the stick being recessed at the points of intersection of the grooves by means of lateral under-cuts opening into the grooves, substantially as described.

In testimony whereof I affix my signature in the presence of two witnesses.

WALTER JONES SCULTHORP.

Witnesses:
ISAAC B. BELL,
ROBT. R. HAZLEWOOD.